(12) United States Patent
Kienzle et al.

(10) Patent No.: US 7,763,224 B2
(45) Date of Patent: Jul. 27, 2010

(54) METHOD FOR SILICONIZING CARBON-CONTAINING MATERIALS

(75) Inventors: Andreas Kienzle, Balgheim (DE); Johann Daimer, Mörfelden-Walldorf (DE); Rudi Beck, Mönchsdeggingen (DE); Otto Mederle, Meitingen (DE); Matthieu Schwartz, Augsburg (DE); Jens Rosenlöcher, Augsburg (DE)

(73) Assignee: Audi AG, Ingolstadt (DE)

( * ) Notice: Subject to any disclaimer, the term of this patent is extended or adjusted under 35 U.S.C. 154(b) by 502 days.

(21) Appl. No.: 11/712,401

(22) Filed: Mar. 1, 2007

(65) Prior Publication Data

US 2008/0213155 A1  Sep. 4, 2008

(30) Foreign Application Priority Data

Mar. 1, 2006  (DE) ....................... 10 2006 009 388

(51) Int. Cl.
*C01B 31/36* (2006.01)
*B05C 3/09* (2006.01)

(52) U.S. Cl. .................. 423/345; 118/50; 118/400; 118/634; 422/292; 422/300

(58) Field of Classification Search .......... 423/344, 423/345, 439; 118/50, 400, 634; 422/292, 422/300; 501/88
See application file for complete search history.

(56) References Cited

U.S. PATENT DOCUMENTS 6,126,749 A * 10/2000 Park et al. ...................... 118/64
6,818,288 B2 * 11/2004 Bauer et al. .............. 428/293.4

FOREIGN PATENT DOCUMENTS

| EP | 0 453 592 A | 10/1991 |
| EP | 0453592 A1 * | 10/1991 |
| EP | 1 607 704 A | 12/2002 |
| EP | 1607704 A1 * | 12/2005 |
| JP | 06 048837 A | 2/1994 |

* cited by examiner

*Primary Examiner*—Stuart Hendrickson
*Assistant Examiner*—Syed Iqbal
(74) *Attorney, Agent, or Firm*—Novak Druce + Quigg

(57) ABSTRACT

A method for treating workpieces that consist of porous carbon material with liquid silicon with the formation of silicon carbide, comprising the steps: Preheating porous carbon workpieces under inert gas to the selected operating temperature $T_B1$, feeding liquid silicon to the porous carbon workpieces at an operating pressure $p_B2$ and an operating temperature $T_B2$, and impregnating the porous carbon workpieces with liquid silicon, reaction of the liquid silicon in the workpiece at a temperature $T_B3$ with the formation of silicon carbide that consists of carbon and silicon, gassing the workpiece with inert gas and cooling from the operating temperature $T_B3$ to the conditioning temperature $T_k$, cooling the workpieces to room temperature, the temperature $T_B3$ being greater than or equal to the temperature $T_B2$, and the workpiece in step d of the method no longer being in contact with liquid silicon outside of the workpiece.

16 Claims, 4 Drawing Sheets

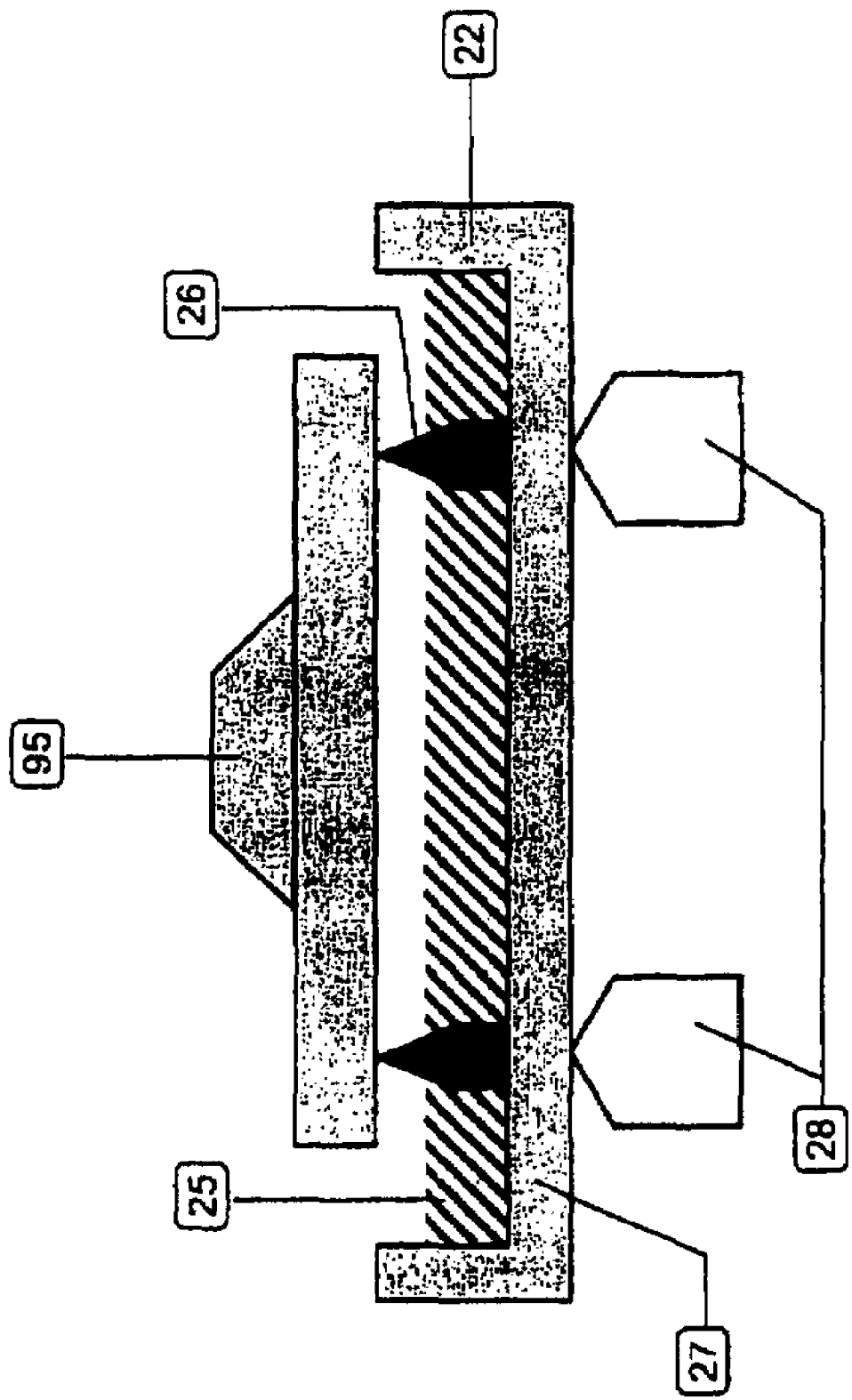

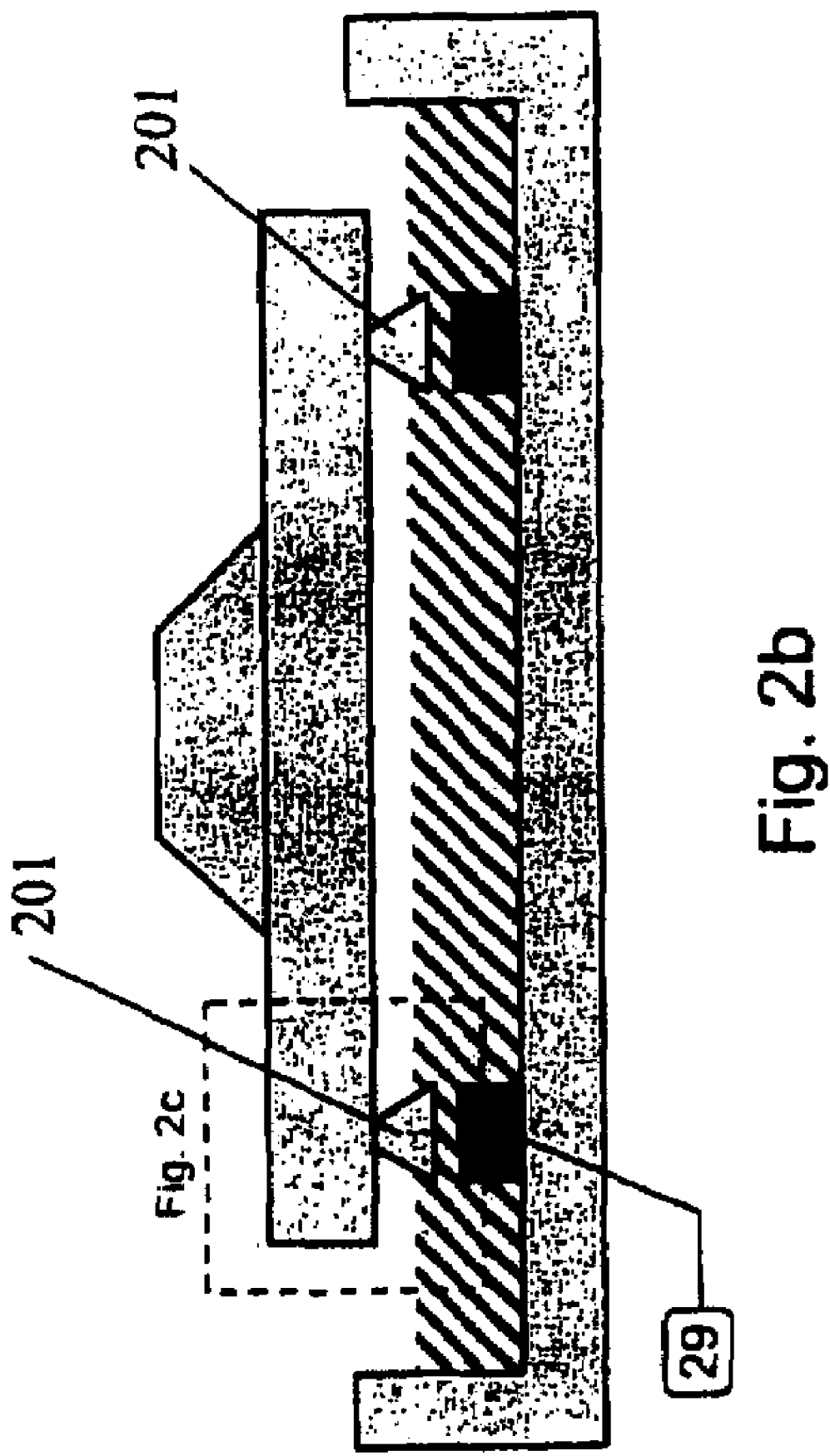

METHOD FOR SILICONIZING CARBON-CONTAINING MATERIALS

CROSS-REFERENCE TO RELATED APPLICATIONS

Figure 1:
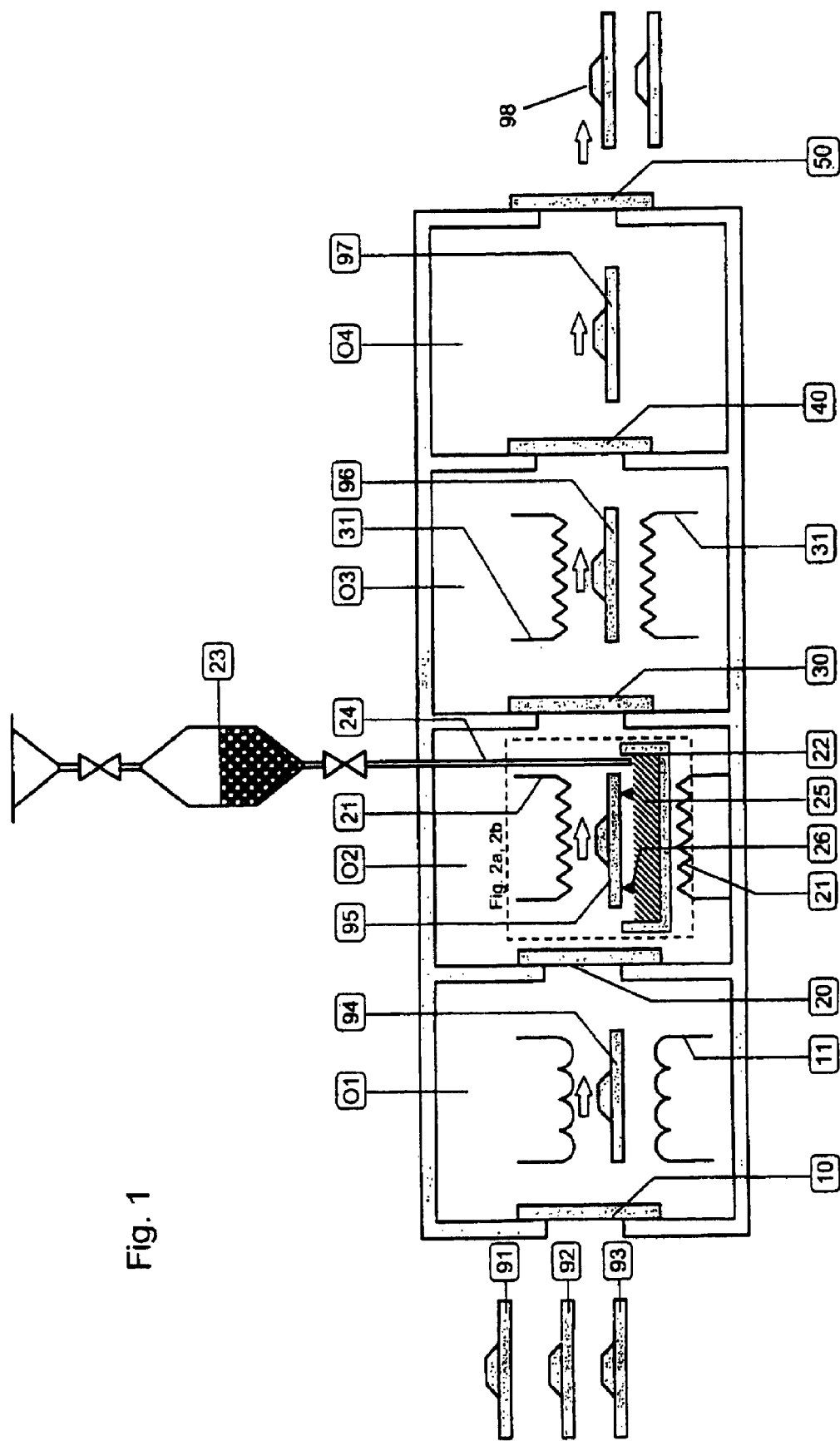

This application claims priority from German Application No. 102006009388.7, filed Mar. 1, 2006.

This invention relates to a method for siliconizing carbon-containing materials and a device that is adapted for this purpose.

A method for siliconizing carbon materials was described by a working group of DLR (Deutsche Forschungsanstalt für Luft- und Raumfahrt e.V. [German Research Institute for Air and Space Travel e.V.]), Stuttgart, Institut für Bauweisen- und Konstruktionsforschung [Institute for Construction and Design Research], in the VDI [Association of German Engineers] Materials Conference in Duisburg on Mar. 9-10, 1994. Carbon materials, reinforced with fibers that consist of carbon, were infiltrated therein with melted silicon in a so-called "liquid siliconization method." By heat treatment, the elementary silicon reacts with the carbon to form silicon carbide. Structural components and in particular friction elements for brake and clutch systems in automobiles can be produced from such materials.

Similar methods are described in, for example, EP 0 956 276, with the carbon workpieces that are to be siliconized and suitably bonded powdery silicon being heated together; the melted silicon penetrates the carbon workpieces and reacts at least partially with the carbon to form silicon carbide.

All known methods are, however, batch methods; in the past, only batch-type conversion of carbon materials into materials with a silicon carbide-containing matrix was possible. In this case, the furnaces in which the silicon is melted and in which the reaction of liquid silicon with carbon to form silicon carbide is performed must first be charged, heated up under inert gas atmosphere and optionally evacuated, cooled after the reaction to form silicon carbide at the necessary holding time, and unloaded. Such a method requires long heating and cooling times and is inefficient in terms of energy use.

The object is therefore to indicate a method with which a treatment, to be operated semi-continuously, of workpieces that optionally consist of fibers, preferably of carbon, reinforced porous carbon with liquid silicon with at least partial conversion to silicon carbide, is possible.

The object is achieved by a method that comprises the following steps:

a Preheating porous carbon workpieces under inert gas to the selected operating temperature $T_B 1$, c Feeding liquid silicon to the porous carbon workpieces at an operating pressure $p_B 2$ and an operating temperature $T_B 2$, and impregnating the porous carbon workpieces with liquid silicon, d Reaction of the liquid silicon in the workpiece at a temperature $T_B 3$ with the formation of silicon carbide that consists of carbon and silicon, e Gassing the workpiece with inert gas and cooling from the operating temperature $T_B 3$ to the conditioning temperature $T_k$ f Cooling the workpieces to room temperature, the temperature $T_B 3$ being greater than or equal to the temperature $T_B 2$, and the workpiece in step d of the method no longer being in contact with liquid silicon outside of the workpiece.

In a preferred way, an additional step b Reduction of the pressure to the operating pressure $p_B 1$ can be inserted between steps a and c, whereby the reduction of the pressure can be carried out before or after the heating or during the heating, but always after the step of rinsing with inert gas.

Another subject of this invention is an adapted device for implementing the method, consisting of at least four chambers O1 to O4, which are connected to one another by locks, whereby each of the chambers, independently of its neighbors, can be heated, cooled, evacuated and filled or rinsed with suitable gases. In this context, each of the chambers $O_1$ is provided with at least one transporting or conveying device, with whose assistance the workpieces are transported from the previous chamber $O_{i-1}$ into the chamber $O_i$ and from the chamber $O_i$ into the subsequent chamber $O_{i+1}$, in the configuration with 4 chambers, for example, $O_{i=0}$ being the inlet and $O_{i=5}$ being the outlet from the configuration consisting of four chambers. In the case of four chambers, the index i can assume the values 1, 2, 3 and 4. The inlet (first lock) and the outlet (last lock) are referred to here as O0 and O5 for simplification.

Spatial separation of the individual steps of the method and clocklike semi-continuous conveying of the workpieces in chambers that are separated from one another and from the environment by locks make it possible to allow the operating conditions (temperature, pressure) in the individual chambers to be as constant as possible; this results in uniform operating conditions, reduction of the energy demand, and greater flexibility in production. Conveying or transporting of the workpieces can be carried out by means and methods that are known in the art, for example by sliding or conveying by means of a slide, by transport on rollers, by means of one or more lifting bars, or on a plain coil chain. In this case, materials are used for the transport means that withstand the selected temperatures and the media that are used, for example selected from graphite and other carbon materials that can be reinforced with fibers, e.g., made of carbon, and also materials that consist of boron nitride or refractory materials that are coated with boron nitride.

In this context, steps a and b as well as steps d and e can be performed in each case in a common chamber, while at least one separate chamber is otherwise provided for each of the steps of the method.

The heating in the chambers is carried out with known heating devices, in particular infrared radiators, inductive heaters, microwave heaters and heating by heated gas (inert gas). Cooling is carried out by a cooled flow of gas flowing through the chamber in question, at higher temperatures, inert gases such as nitrogen and argon being preferred, while at temperatures of no more than 300° C., air can also be used.

By preference an induction heater in the chamber O1 is used, since this type of heater can very quickly introduce large amounts of energy into the workpiece.

The device will be explained using the drawings.

Figure 2C:
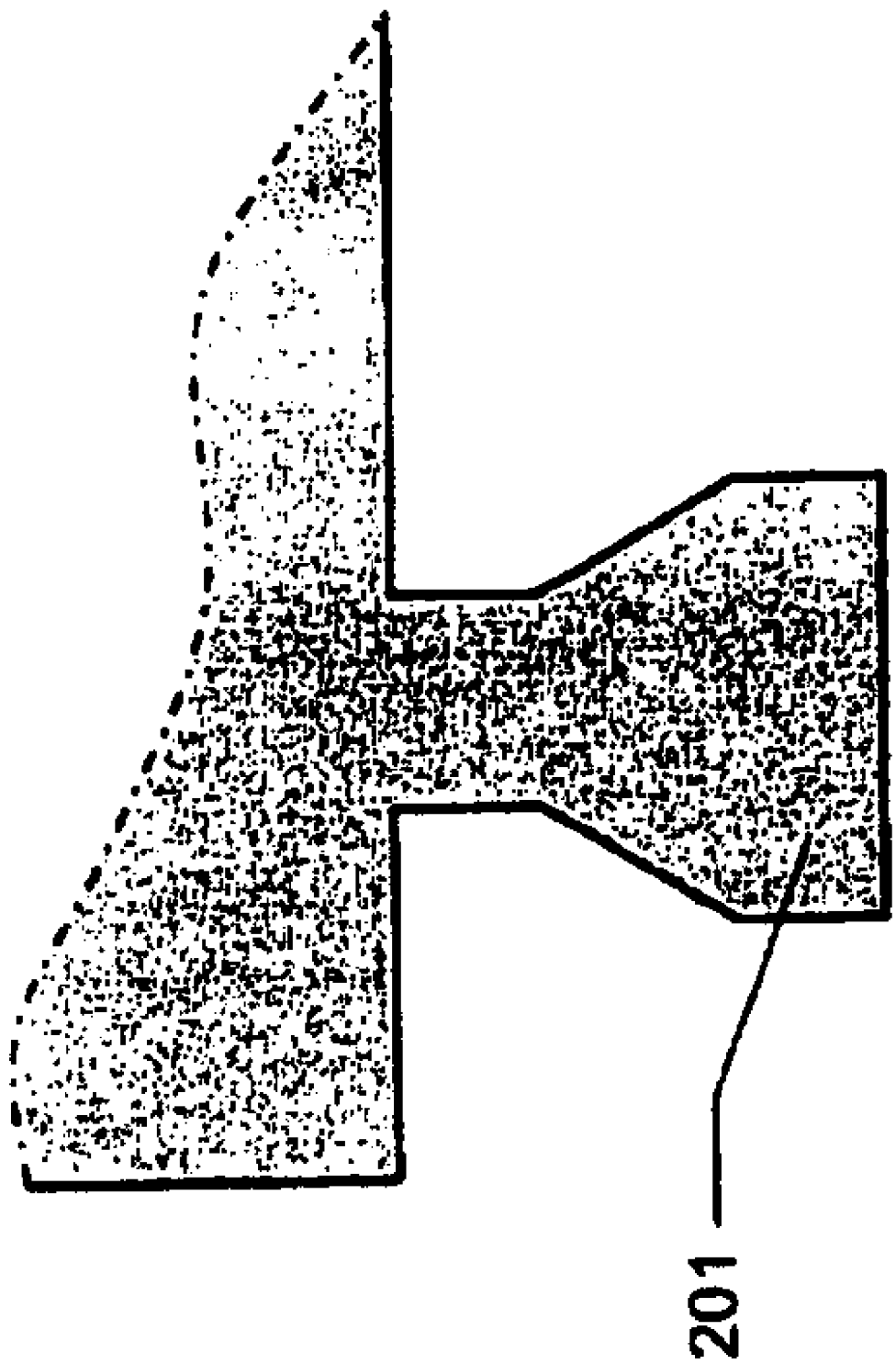

FIG. 1 shows a diagrammatic section through a configuration with four chambers; to improve the clarity, the feed and exhaust cycles are not indicated for the gases that are used, FIG. 2a shows a cutaway of the second chamber O2 according to FIG. 1, with the detailed representation of the positioning of the workpiece 95 on (two shown) preferably porous wicks 26, which guide the liquid silicon to the workpiece 95, FIG. 2b shows a cutaway of the chamber O2 according to FIG. 2a, with the detailed representation of an alternative embodiment, the workpiece itself having a molded-on fitting 201, and FIG. 2c shows an enlarged section through a workpiece with a molded-on fitting 201.

According to the invention, the procedure is preferably carried out in a device, shown in FIG. 1, that consists of four chambers, so that the workpieces are inserted in succession into the first chamber O1 by the lock 10 from outside, here represented as the next to be inserted and referred to as 91, 92 and 93. After closing the lock 10, the chamber O1 is flushed according to step a of the method with a wave of inert gas, preferably with nitrogen or argon, and after the displacement of the air by means of optionally several sequences of inert gas flushing and evacuation, the workpiece 94 that is already located in the chamber is preferably heated by an induction heater 11 from room temperature to the operating temperature $T_B1$, which can be from 1300° C. to 1800° C., preferably 1350° C. to 1750° C. In a preferred way, the operating pressure is reduced by 1 bar (outside pressure, $10^5$ Pa) to a value $p_B1$ of preferably no more than 100 mbar (100 hPa), especially preferably up to 50 hPa (50 mbar), and in particular no more than 20 mbar (20 hPa). This reduction of the pressure according to step b of the method can be carried out before heating, during heating or after heating.

At the latest before the lock 20 is opened, a negative pressure is produced in the chamber O1, as it also preferably constantly prevails in chamber O2, preferably below 10 hPa (10 mbar), in particular below 1 Pa ($10^{-2}$ mbar).

If this pressure is reached, the workpiece is transported by the lock 20 into the chamber O2, where it is now referred to as 95. After the lock 20 is closed, a new workpiece is inserted from outside by the lock 10 into the chamber O1 and heated as described above.

In the chamber O2, the workpiece 95 is taken up at an operating pressure $p_B2$ of no more than about $10^{-2}$ mbar (1 Pa) and at an operating temperature $T_B2$ that can be adjusted via the heater 21 from 1450° C. to 1700° C. by a transport device, not shown, and placed on the supports (porous wicks) 26 that are mounted in the siliconizing device 27. In this siliconizing device 27, liquid silicon 25 that is located in a basin 22 according to step c of the method moves into the workpiece 95 that consists of carbon via the porous wicks 26. At the temperature prevailing in the chamber, of between 1450° C. and 1700° C., silicon penetrates into the pores of the workpiece 95 and reacts at least partially according to step d of the method with the carbon that is present in the workpiece to form silicon carbide. The workpiece is referred to as "siliconized workpiece" after this treatment.

In a preferred embodiment, the basin 22 is placed in the chamber O2 on one or more (two in number shown in the drawing of FIG. 2a) pressure measuring cells 28; this makes it possible to determine the mass of the silicon taken up in the workpiece by weighing the basin before the attachment of the workpiece 95 and after the infiltration and the removal of the workpiece 95.

After the siliconization, the siliconized workpiece 95 is raised from the wicks and transported by the lock 30 into the chamber O3.

After each clock cycle (removal of a siliconized workpiece 95 from O2 and input of a freshly preheated workpiece from the chamber O1), the level of the liquid silicon in the basin 22 is made up again to the preset value; to this end, a reservoir 23 with liquid silicon, which is connected by a pipe 24 to the basin 22, is used.

In the chamber O3, optionally by further heating with the heater 31, the reaction is completed to the desired extent according to step d of the method in the siliconized workpiece, whereby the spatial separation of the chamber O2 produces the advantageous possibility of annealing the workpiece in the chamber O3 even at a temperature $T_B3$ above the temperature $T_B2$ without running the risk of silicon escaping from the basin 22 as in the selection of a higher temperature in the chamber O2 by the higher vapor pressure. It was noted namely in the tests upon which this invention was based that the silicon penetrates into the pores of the workpiece (now 96) has a considerably lower vapor pressure compared to the silicon in the bath 22 at the same temperature.

A preferred temperature range for such an after-reaction is that of 1500° C. to 2000° C., especially preferably 1600° C. to 1900° C., and in particular 1700° C. to 1800° C. The formation of the silicon carbide can proceed considerably faster, which results in a desirable shortening of the cycle times in the method according to the invention.

Heating in the chambers O2 and O3 is carried out preferably by a radiant heater, for example with graphite heating elements 21 and 31 that are brought to annealing by Joule heating.

As soon as the reaction to form silicon carbide is carried out to the desired extent, the workpiece is cooled in the chamber O3 by blowing in cold inert gas according to step e of the method, preferably to a conditioning temperature $T_K$ in the range of 500° C. to 300° C. The operating pressure $p_B3$ in this case increases from initially (after-reaction) below 1 mbar (1 hPa) to normal pressure ($10^5$ Pa=1 bar). Then, the workpiece 96 is brought through the lock 40 into the chamber O4 and further cooled to room temperature there in the position 97 according to step f of the method, first with inert gas, starting from temperatures of no more than 300° C., and also with air. The finished workpiece 98 can then be removed by the lock 50.

Of course, before the next workpiece 95 is conveyed into the chamber O3 for the after-reaction, this chamber O3 is again evacuated to the operating pressure $p_B3$.

In the method according to the invention, in an embodiment with four chambers, a dwell time of workpieces in the chambers O1 to O4 of three minutes up to twenty minutes in each case has proven advantageous.

The method according to the invention ensures that the workpieces 95 that are brought into the chamber O2 for siliconization are always brought to the operating temperature prevailing in O2 and that the operating pressure in O2 is always maintained. This uniformity of pressure and temperature in the siliconization step has proven essential for reaching a constant product quality. Another advantage is that the workpieces are not cooled in contact with the silicon bath, and this keeps pores that are formed during cooling by volume contraction of silicon from being filled by subsequently suctioned-off silicon.

If several steps of the method are performed in one of the chambers, for example in O3, the stage of the after-reaction, which optionally is carried out at an elevated temperature compared to O2, and then the cooling, it is further preferred to subdivide these chambers. In the case of O3, such a subdivision according to steps d and e of the method are provided, first to perform the after-reaction at the higher temperature and then to bring the workpiece in turn through a lock in an additional chamber configured between O3 and O4 for cooling. In this way, it is achieved that the chamber O3 can be operated at a constant temperature, and the chambers configured between O3 and O4 are used only for cooling.

It is also possible to configure two chambers behind one another with the same step of the method if the necessary dwell time: for a step of the method deviates considerably from that for the other steps in the method, in this way achieving a uniform clock cycle for all chambers. The minimum number of chambers necessary for the method is four.

In another embodiment, the workpieces 9 have molded-on fittings 201 on a flat side, these fittings 201 having a tapering section on this flat side as is shown in FIG. 2b and enlarged in FIG. 2c. These fittings 201 dip into the liquid silicon 25 in the silicon bath 27 or are on the supports 29. After the finished workpieces are removed from the device, these fittings 201 can easily be broken off, since the extent of the tapering section is selected to make this possible.

It is also possible, of course, to use alloys or liquid mixtures of silicon with one or more other elements for infiltration instead of pure silicon. In particular, additives of iron (in a percentage by mass of up to 6% in the mixture), refractory metals, such as chromium, molybdenum, tungsten, zirconium (in a percentage by mass of up to 3% in the mixture in each case) as well as manganese, aluminum, cobalt and nickel (in a percentage by mass of up to 3% in the mixture in each case) have proven their value.

LIST OF REFERENCE DESIGNATIONS

O1 Chamber 1
O2 Chamber 2
O3 Chamber 3
O4 Chamber 4
10 Lock
11 Induction Heater
20 Lock
21 Heater
22 Basin
23 Reservoir with Liquid Silicon
24 Pipe
25 Liquid Silicon
26 Wicks
27 Siliconizing Device
28 Pressure measuring cell
29 Supports
30 Lock
31 Heater
40 Lock
50 Lock
91, 92, 93 Workpieces
94 Workpiece in Chamber O1
95 Siliconized Workpiece in Chamber O2
96 Siliconized Workpiece in Chamber O3
97 Siliconized Workpiece in Chamber O4
98 Finished Siliconized Workpiece

The invention claimed is:

1. A method for treating workpieces which workpieces consist of porous carbon material with liquid silicon with the formation of silicon carbide, the method comprising the steps:
   a) preheating porous carbon workpieces under inert gas to the selected operating temperature $T_B1$,
   b) feeding liquid silicon to the porous carbon workpieces at an operating pressure $p_B2$ and an operating temperature $T_B2$, and impregnating the porous carbon workpieces with liquid silicon,
   c) reacting the liquid silicon in the workpiece at a temperature $T_B3$ with the formation of silicon carbide,
   d) gassing the workpiece with inert gas and cooling from the operating temperature $T_B3$ to the conditioning temperature $T_k$, and
   e) cooling the workpieces to room temperature,
   wherein the temperature $T_B3$ is greater than the temperature $T_B2$, and the workpiece in the step d is not in contact with liquid silicon outside of the workpiece.

2. The method according to claim 1, further comprising dropping to the operating pressure $p_B1$ of no more than 100 hPa, between steps a) and b).

3. The method according to claim 1, wherein the operating temperature $T_B1$ is between 1300° C. and 1800° C.

4. The method according to claim 1, wherein the operating temperature $T_B2$ is between 1450° C. and 1700° C.

5. The method according to claim 1, wherein the operating temperature $T_B3$ is between 1500° C. and 2000° C.

6. The method according to claim 1, wherein the operating temperature $T_B3$ is at least 50 K more than the operating temperature $T_B2$.

7. The method according to claim 1, wherein in step b), the silicon mass taken up by the workpiece is measured by weighing a basin before attachment of the workpiece and after infiltration and removal of the workpiece.

8. The method according to claim 1, wherein the workpiece comprises at least two fittings, having tapering sections and wherein the method further comprises separating the fittings from the workpiece.

9. The method according to claim 1, whereby the steps are performed in sequence.

10. A method of siliconizing a material comprising, in sequence:
    introducing a carbon-containing workpiece into a first chamber of a device, and flushing the first chamber with inert gas;
    heating the workpiece to a first operating temperature;
    opening a lock separating the first chamber from a second chamber;
    moving the workpiece into a second chamber;
    closing the lock;
    bringing the workpiece to an operating pressure of less than about 1 Pa and a second operating temperature;
    introducing liquid silicon, at a third temperature, into the workpiece, and permitting the silicon to penetrate into pores of the workpiece to form silicon carbide while preventing the workpiece from contacting liquid silicon outside the workpiece; and
    subjecting the workpiece, in a third chamber, to an inert gas comprising cooling the workpiece to a conditioning temperature; wherein the second operating temperature is less than or equal to the third temperature.

11. The method of claim 10, further comprising reducing the pressure of the second chamber.

12. The method of claim 11, wherein the reducing step comprises reducing the pressure by 1 bar.

13. The method of claim 10, wherein the first temperature is from 1300° C. to 1800° C.

14. The method of claim 10, further comprising introducing a second workpiece into the first chamber after the moving step.

15. The method of claim 10, wherein the second operating temperature is from 1450° C. to 1700° C.

16. The method of claim 10, wherein the liquid silicon is delivered from a basin, and further comprising determining the amount of silicon taken by the workpiece by calculating a difference in mass of the basin following the introduction step.

* * * * *